(12) United States Patent
Luo

(10) Patent No.: US 9,670,299 B2
(45) Date of Patent: Jun. 6, 2017

(54) POLYMERS FUNCTIONALIZED WITH NITROSO COMPOUNDS

(71) Applicant: BRIDGESTONE CORPORATION, Chuo-ku (JP)

(72) Inventor: Steven Luo, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

(21) Appl. No.: 14/819,919

(22) Filed: Aug. 6, 2015

(65) Prior Publication Data

US 2016/0032030 A1 Feb. 4, 2016

Related U.S. Application Data

(62) Division of application No. 14/101,922, filed on Dec. 10, 2013, now Pat. No. 9,127,100, which is a division of application No. 13/470,670, filed on May 14, 2012, now Pat. No. 8,623,967, which is a division of application No. 12/347,493, filed on Dec. 31, 2008, now Pat. No. 8,188,195.

(51) Int. Cl.
| | |
|---|---|
| *C08F 36/04* | (2006.01) |
| *C08F 36/06* | (2006.01) |
| *C08F 136/04* | (2006.01) |
| *C08F 136/06* | (2006.01) |
| *C08F 4/06* | (2006.01) |
| *C08F 8/30* | (2006.01) |
| *C08C 19/44* | (2006.01) |
| *C08L 15/00* | (2006.01) |
| *C08F 136/20* | (2006.01) |
| *C08K 3/04* | (2006.01) |
| *C08L 7/00* | (2006.01) |
| *C08L 9/00* | (2006.01) |

(52) U.S. Cl.
CPC ............ *C08F 136/06* (2013.01); *C08C 19/44* (2013.01); *C08F 4/06* (2013.01); *C08F 8/30* (2013.01); *C08F 36/04* (2013.01); *C08F 36/06* (2013.01); *C08F 136/04* (2013.01); *C08F 136/20* (2013.01); *C08L 15/00* (2013.01); *C08K 3/04* (2013.01); *C08L 7/00* (2013.01); *C08L 9/00* (2013.01)

(58) Field of Classification Search
None
See application file for complete search history.

(56) References Cited

U.S. PATENT DOCUMENTS

| | | |
|---|---|---|
| 1,223,396 A | 4/1917 | Karlsson |
| 2,227,957 A | 1/1941 | Brasse |
| 3,297,667 A | 1/1967 | Von Dohlen et al. |
| 3,322,738 A | 5/1967 | Uraneck et al. |
| 3,541,063 A | 11/1970 | Throckmorton et al. |
| 3,742,057 A | 6/1973 | Bunting et al. |
| 3,794,604 A | 2/1974 | Throckmorton et al. |
| 3,886,127 A | 5/1975 | Furukawa et al. |
| 3,998,998 A | 12/1976 | Uraneck et al. |
| 4,185,042 A | 1/1980 | Verkouw |
| 4,461,883 A | 7/1984 | Takeuchi et al. |
| 4,550,142 A | 10/1985 | Akita et al. |
| 4,647,625 A | 3/1987 | Aonuma et al. |
| 4,751,275 A | 6/1988 | Witte et al. |
| 4,791,174 A | 12/1988 | Bronstert et al. |
| 4,906,706 A | 3/1990 | Hattori et al. |
| 4,990,573 A | 2/1991 | Andreussi et al. |
| 5,064,910 A | 11/1991 | Hattori et al. |
| 5,066,729 A | 11/1991 | Stayer et al. |
| 5,109,907 A | 5/1992 | Stayer et al. |
| 5,227,431 A | 7/1993 | Lawson et al. |
| 5,310,798 A | 5/1994 | Lawson et al. |
| 5,508,333 A | 4/1996 | Shimizu |
| 5,567,784 A | 10/1996 | Wieder et al. |
| 5,844,050 A | 12/1998 | Fukahori et al. |
| 5,866,171 A | 2/1999 | Kata |
| 5,866,650 A | 2/1999 | Lawson et al. |
| 5,876,527 A | 3/1999 | Tsuruta et al. |
| 5,916,961 A | 6/1999 | Hergenrother et al. |
| 5,931,211 A | 8/1999 | Tamura |
| 5,971,046 A | 10/1999 | Koch et al. |
| 6,117,927 A | 9/2000 | Toba et al. |
| 6,172,160 B1 | 1/2001 | Nakamura et al. |
| 6,194,505 B1 | 2/2001 | Sone et al. |
| 6,197,713 B1 | 3/2001 | Lynch |
| 6,197,888 B1 | 3/2001 | Luo |
| 6,255,416 B1 | 7/2001 | Sone et al. |
| 6,291,591 B1 | 9/2001 | Luo |

(Continued)

FOREIGN PATENT DOCUMENTS

| | | |
|---|---|---|
| DE | 138 070 A1 | 10/1979 |
| EP | 0863165 B1 | 6/2003 |
| GB | 835752 A | 5/1960 |
| JP | 05-051406 | 3/1993 |
| JP | 05-059103 | 3/1993 |
| JP | 10-306113 | 11/1998 |
| JP | 11-035633 | 2/1999 |
| RU | 2114128 C1 | 6/1998 |
| WO | 01/34659 A1 | 5/2001 |
| WO | 02/38615 A1 | 5/2002 |

OTHER PUBLICATIONS

Shen et al. Journal of Polymer Science: Polymer Chemistry Edition, vol. 18, 1980, pp. 3345-3357.

(Continued)

*Primary Examiner* — Robert Sellers
(74) *Attorney, Agent, or Firm* — Meredith E. Hooker; Arthur M. Reginelli

(57) ABSTRACT

A method for preparing a functionalized polymer, the method comprising the steps of: (i) polymerizing monomer with a coordination catalyst to form a reactive polymer; and (ii) reacting the reactive polymer with a nitroso compound.

12 Claims, 2 Drawing Sheets

(56) References Cited

U.S. PATENT DOCUMENTS

| | | | |
|---|---|---|---|
| 6,303,692 B1 | 10/2001 | Luo | |
| 6,699,813 B2 | 3/2004 | Luo et al. | |
| 6,759,497 B2 | 7/2004 | Grun et al. | |
| 6,838,526 B1 | 1/2005 | Sone et al. | |
| 6,838,534 B2 | 1/2005 | Laubry | |
| 6,897,270 B2 | 5/2005 | Ozawa et al. | |
| 6,943,250 B2 | 9/2005 | Brockmann | |
| 6,977,281 B1 | 12/2005 | Ozawa et al. | |
| 6,992,147 B1 | 1/2006 | Ozawa et al. | |
| 7,008,899 B2 | 3/2006 | Luo et al. | |
| 7,030,195 B2 | 4/2006 | Viola et al. | |
| 7,056,998 B2 | 6/2006 | Laubry et al. | |
| 7,094,849 B2 | 8/2006 | Luo et al. | |
| 7,153,919 B2 | 12/2006 | Hogan et al. | |
| 7,294,680 B2 | 11/2007 | Sone et al. | |
| 7,335,712 B2 | 2/2008 | Yan et al. | |
| 7,342,070 B2 | 3/2008 | Tsukimawashi et al. | |
| 7,351,776 B2 | 4/2008 | Tartamella et al. | |
| 8,017,695 B2 | 9/2011 | Luo et al. | |
| 8,188,195 B2 | 5/2012 | Luo | |
| 2003/0219647 A1* | 11/2003 | Wariishi | H01G 9/2009 |
| | | | 429/111 |
| 2006/0004131 A1 | 1/2006 | Ozawa et al. | |
| 2006/0025539 A1 | 2/2006 | Ozawa et al. | |
| 2006/0030677 A1 | 2/2006 | Ozawa et al. | |
| 2006/0264589 A1 | 11/2006 | Yan et al. | |
| 2006/0264590 A1 | 11/2006 | Hogan et al. | |
| 2007/0037956 A1 | 2/2007 | Hogan et al. | |
| 2007/0149717 A1 | 6/2007 | Luo et al. | |
| 2007/0258942 A1 | 11/2007 | Stamler et al. | |
| 2007/0276122 A1 | 11/2007 | Luo | |
| 2008/0051519 A1 | 2/2008 | Luo et al. | |
| 2008/0051552 A1 | 2/2008 | Luo et al. | |
| 2008/0146745 A1 | 6/2008 | Luo et al. | |
| 2008/0154020 A1 | 6/2008 | Yan et al. | |
| 2008/0182954 A1 | 7/2008 | Luo et al. | |
| 2008/0312315 A1 | 12/2008 | Daniloff et al. | |
| 2009/0043046 A1 | 2/2009 | Luo et al. | |
| 2009/0043055 A1 | 2/2009 | Luo et al. | |
| 2009/0099325 A1 | 4/2009 | Luo et al. | |
| 2009/0171035 A1 | 7/2009 | Luo et al. | |
| 2010/0004413 A1 | 1/2010 | Luo et al. | |
| 2010/0099826 A1 | 4/2010 | Ozawa et al. | |
| 2010/0280217 A1 | 11/2010 | Luo et al. | |
| 2011/0077325 A1 | 3/2011 | Luo | |
| 2011/0144282 A1 | 6/2011 | Luo | |
| 2011/0152449 A1 | 6/2011 | Luo et al. | |

OTHER PUBLICATIONS

Hsieh, et al. Rubber Chemistry and Technology, vol. 58, 1985, pp. 117-145.
Wilson, D.J. Journal of Polymer Science, Part A, Polymer Chemistry, vol. 33, 1995, pp. 2505-2513.
Hattori, et al. "Modification of Neodymium High cis-1,4-Polybutadiene with Tin Compounds", Journal of Elastomers and Plastics, vol. 23, 1991, pp. 135-151.
Hattori, et al. "Chemical Modification of Neodymium High cis-1,4-polybutadiene with Styreneoxide" Polymers for Advanced Technologies, vol. 4, pp. 450-456.
Hsieh, et al. Ind. Eng. Chem. Prod. Dev. 1986, vol. 25, pp. 456-463.
Derwent accession No. 2000-036535 for Russian Patent No. 2,114,128 C1, Goldberg et al., Jun. 27, 2998, 1 page.
Quirk, et al. "Polymerization of butadiene using neodymium versatate-based catalyst systems: preformed catalysts with SiCl4 as halide source" Polymer International, vol. 49, 2000, pp. 751-756.

* cited by examiner

POLYMERS FUNCTIONALIZED WITH NITROSO COMPOUNDS

This application is a divisional application of U.S. Pat. No. 9,127,100, filed Dec. 10, 2013, which was a divisional application of U.S. Pat. No. 8,623,967, filed on May 14, 2012, and which was a divisional application from U.S. Pat. No. 8,188,195, filed Dec. 31, 2008, and are incorporated herein by reference.

FIELD OF THE INVENTION

One or more embodiments of the present invention relate to functionalized polymers and methods for their manufacture.

BACKGROUND OF THE INVENTION

In the art of manufacturing tires, it is desirable to employ rubber vulcanizates that demonstrate reduced hysteresis, i.e., less loss of mechanical energy to heat. For example, rubber vulcanizates that show reduced hysteresis are advantageously employed in tire components, such as sidewalls and treads, to yield tires having desirably low rolling resistance. The hysteresis of a rubber vulcanizate is often attributed to the free polymer chain ends within the crosslinked rubber network, as well as the dissociation of filler agglomerates.

Functionalized polymers have been employed to reduce the hysteresis of rubber vulcanizates. The functional group of the functionalized polymer may reduce the number of free polymer chain ends via interaction with filler particles. Also, the functional group may reduce filler agglomeration. Nevertheless, whether a particular functional group imparted to a polymer can reduce hysteresis is often unpredictable.

Functionalized polymers may be prepared by post-polymerization treatment of reactive polymers with certain functionalizing agents. However, whether a reactive polymer can be functionalized by treatment with a particular functionalizing agent can be unpredictable. For example, functionalizing agents that work for one type of polymer do not necessarily work for another type of polymer, and vice versa.

Lanthanide-based catalyst systems are known to be useful for polymerizing conjugated diene monomers to form polydienes having a high content of cis-1,4 linkage. The resulting cis-1,4-polydienes may display pseudo-living characteristics in that, upon completion of the polymerization, some of the polymer chains possess reactive ends that can react with certain functionalizing agents to yield functionalized cis-1,4-polydienes.

The cis-1,4-polydienes produced with lanthanide-based catalyst systems typically have a linear backbone, which is believed to provide better tensile properties, higher abrasion resistance, lower hysteresis, and better fatigue resistance as compared to the cis-1,4-polydienes prepared with other catalyst systems such as titanium-, cobalt-, and nickel-based catalyst systems. Therefore, the cis-1,4-polydienes made with lanthanide-based catalysts are particularly suitable for use in tire components such as sidewalls and treads. However, one disadvantage of the cis-1,4-polydienes prepared with lanthanide-based catalysts is that the polymers exhibit high cold flow due to their linear backbone structure. The high cold flow causes problems during storage and transport of the polymers and also hinders the use of automatic feeding equipment in rubber compound mixing facilities.

Because functionalized polymers are advantageous, especially in the manufacture of tires, there exists a need to develop new functionalized polymers that give reduced hysteresis and reduced cold flow.

SUMMARY OF THE INVENTION

One or more embodiments of the present invention provide a method for preparing a functionalized polymer, the method comprising the steps of: (i) polymerizing monomer with a coordination catalyst to form a reactive polymer; and (ii) reacting the reactive polymer with a nitroso compound.

One or more embodiments of the present invention provide a functionalized cis-1,4-polydiene defined by the formula:

where π is a cis-1,4-polydiene chain having a cis-1,4-linkage content that is greater than 60%, where β is a mono-valent organic group, and where R' is a hydrogen atom or a mono-valent organic group.

One or more embodiments of the present invention provide a functionalized cis-1,4-polydiene prepared by the steps of (i) polymerizing conjugated diene monomer with a coordination catalyst to form a reactive cis-1,4-polydiene having a cis-1,4-linkage content that is greater than 60%; and (ii) reacting the reactive cis-1,4-polydiene with a nitroso compound.

DETAILED DESCRIPTION OF ILLUSTRATIVE EMBODIMENTS

Figure 1:
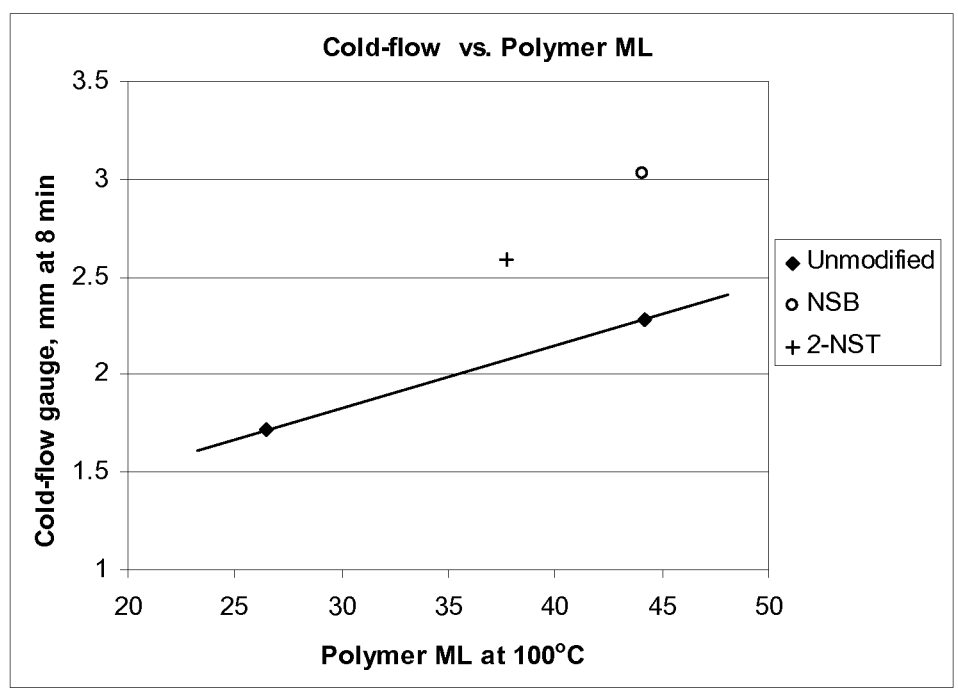
FIG. 1 is a graphical plot of cold-flow gauge (mm at 8 min) versus Mooney viscosity (ML 1+4 at 100° C.) for functionalized cis-1,4-polybutadiene prepared according to one or more embodiments of the present invention as compared to unfunctionalized cis-1,4-polybutadiene.

According to one or more embodiments of the present invention, a reactive polymer is prepared by polymerizing conjugated diene monomer with a coordination catalyst, and this reactive polymer can then be functionalized by reaction with a nitroso compound. The resultant functionalized polymers can be used in the manufacture of tire components. In one or more embodiments, the resultant functionalized polymers, which include cis-1,4-polydienes, exhibit advantageous cold-flow resistance and provide tire components that exhibit advantageously low hysteresis.

Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

In one or more embodiments, the reactive polymer is prepared by coordination polymerization, wherein monomer is polymerized by using a coordination catalyst system. The key mechanistic features of coordination polymerization have been discussed in books (e.g., Kuran, W., *Principles of Coordination Polymerization*; John Wiley & Sons: New York, 2001) and review articles (e.g., Mulhaupt, R., *Macromolecular Chemistry and Physics* 2003, volume 204, pages 289-327). Coordination catalysts are believed to initiate the polymerization of monomer by a mechanism that involves the coordination or complexation of monomer to an active metal center prior to the insertion of monomer into a growing polymer chain. An advantageous feature of coordination catalysts is their ability to provide stereochemical control of polymerizations and thereby produce stereoregular polymers. As is known in the art, there are numerous methods for creating coordination catalysts, but all methods eventually generate an active intermediate that is capable of coordinating with monomer and inserting monomer into a covalent bond between an active metal center and a growing polymer chain. The coordination polymerization of conjugated dienes is believed to proceed via π-allyl complexes as intermediates. Coordination catalysts can be one-, two-, three- or multi-component systems. In one or more embodiments, a coordination catalyst may be formed by combining a heavy metal compound (e.g., a transition metal compound or a lanthanide compound), an alkylating agent (e.g., an organoaluminum compound), and optionally other co-catalyst components (e.g., a Lewis acid or a Lewis base). In one or more embodiments, the heavy metal compound may be referred to as a coordinating metal compound.

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Useful coordination catalyst systems include lanthanide-based catalyst systems. These catalyst systems may advantageously produce cis-1,4-polydienes that, prior to quenching, have reactive chain ends and may be referred to as pseudo-living polymers. While other coordination catalyst systems may also be employed, lanthanide-based catalysts have been found to be particularly advantageous, and therefore, without limiting the scope of the present invention, will be discussed in greater detail.

The practice of one or more embodiments of the present invention is not limited by the selection of any particular lanthanide-based catalyst. In one or more embodiments, the catalyst composition may include a lanthanide compound, an alkylating agent, and a halogen-containing compound that includes one or more labile halogen atoms. Where the lanthanide compound and/or alkylating agent include one or more labile halogen atoms, the catalyst need not include a separate halogen-containing compound; e.g., the catalyst may simply include a halogenated lanthanide compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e., a compound that can undergo a chemical reaction to form a non-coordinating anion, may be employed in lieu of a halogen-containing compound. In one embodiment, where the alkylating agent includes an organoaluminum hydride compound, the halogen-containing compound may be a tin halide as disclosed in U.S. Pat. No. 7,008,899, which is incorporated herein by reference. In these or other embodiments, other organometallic compounds, Lewis bases, and/or catalyst modifiers may be employed in addition to the ingredients or components set forth above. For example, in one embodiment, a nickel-containing compound may be employed as a molecular weight regulator as disclosed in U.S. Pat. No. 6,699,813, which is incorporated herein by reference.

Various lanthanide compounds or mixtures thereof can be employed. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide compounds, which can be suspended in the polymerization medium to form the catalytically active species, are also useful.

Lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Without wishing to limit the practice of the present invention, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl (2-ethylhexyl)phosphinate, neodymium (1-methylheptyl) (2-ethylhexyl)phosphinate, and neodymium (2-ethylhexyl)(p-nonylphenyl)phosphinate.

Neodymium carbamates include neodymium dimethylcarbamate, neodymium diethylcarbamate, neodymium diisopropylcarbamate, neodymium dibutylcarbamate, and neodymium dibenzylcarbamate.

Neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropylxanthate, neodymium butylxanthate, and neodymium benzylxanthate.

Neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can also serve as the halogen-containing compound. A Lewis base such as tetrahydrofuran (THF) may be employed as an aid for solubilizing this class of neodymium compounds in inert organic solvents.

The term "organolanthanide compound" may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various alkylating agents, or mixtures thereof, can be used. Alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). Where the alkylating agent includes a labile halogen atom, the alkylating agent may also serve as the halogen-containing compound. In one or more embodiments, alkylating agents include organoaluminum and organomagnesium compounds.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, mono-valent organic groups may include hydrocarbyl groups or substituted hydrocarbyl groups such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. These groups may also contain heteroatoms such as, but not limited to, nitrogen, boron, oxygen, silicon, sulfur, tin, and phosphorus atoms.

Types of organoaluminum compounds represented by the formula $AlR_nX_{3-n}$ include trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl) aluminum, tribenzylaluminum, diethylphenylaluminum, diethyl-p-tolylaluminum, diethylbenzylaluminum, ethyldiphenylaluminum, ethyldi-ptolylaluminum, and ethyldibenzylaluminum.

Dihydrocarbylaluminum hydride compounds include diethylaluminum hydride, di-n-propylaluminum hydride, diisopropylaluminum hydride, di-nbutylaluminum hydride, diisobutylaluminum hydride, di-n- octylaluminum hydride, diphenylaluminum hydride, di-p-tolylaluminum hydride, dibenzylaluminum hydride, phenylethylaluminum hydride, phenyl-n-propyl alum mum hydride, phenylisopropylaluminum hydride, phenyl-n-butylaluminum hydride, phenylisobutylaluminum hydride, phenyl-n-octylaluminum hydride, p tolylethylaluminum hydride, p-tolyl-n-propylaluminum hydride, p tolylisopropylaluminum hydride, p-tolyl-n-butylaluminum hydride, p tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydride compounds include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum halide compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propyl alum mum chloride, benzylisopropylaluminum chloride, benzyl-n-butylaluminum chloride, benzylisobutylaluminum chloride, and benzyl-n-octylaluminum chloride.

Hydrocarbylaluminum dihalide compounds include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds represented by the formula $AlR_nX_{3-n}$ include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds include aluminoxanes. Aluminoxanes include oligomeric linear aluminoxanes that can be represented by the general formula:

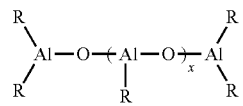

and oligomeric cyclic aluminoxanes that can be represented by the general formula:

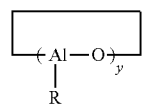

where x may be an integer of 1 to about 100, and in other embodiments about 10 to about 50; y may be an integer of 2 to about 100, and in other embodiments about 3 to about 20; and where each R, which may be the same or different, may be a mono-valent organic group that is attached to the aluminum atom via a carbon atom. Mono-valent organic groups are defined above. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$) such as diisobutylaluminum hydride are employed in combination.

The term "organomagnesium compound" may refer to any magnesium compound that contains at least one magnesium-carbon bond. Organomagnesium compounds may be soluble in a hydrocarbon solvent.

One class of organomagnesium compounds that can be utilized may be represented by the formula $MgR_2$, where each R, which may be the same or different, is a mono-valent organic group that is attached to the magnesium atom via a carbon atom. In one or more embodiments, mono-valent organic groups may include hydrocarbyl groups or substituted hydrocarbyl groups such as, but not limited to, alkyl, cycloalkyl, alkenyl, cycloalkenyl, aryl, allyl, aralkyl, alkaryl, or alkynyl groups. These groups may contain heteroatoms such as, but not limited to, nitrogen, boron, oxygen, silicon, sulfur, tin, and phosphorus atoms.

Specific examples of organomagnesium compounds represented by the formula $MgR_2$ include diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized include those that may be represented by the formula RMgX, where R is a mono-valent organic group that is attached to the magnesium atom via a carbon atom, and X is a hydrogen atom, a halogen atom, a carboxylate group, an alkoxide group, or an aryloxide group. Mono-valent organic groups are defined above. In one or more embodiments, X is a carboxylate group, an alkoxide group, or an aryloxide group.

Exemplary types of organomagnesium compounds represented by the formula RMgX include hydrocarbylmagnesium hydride, hydrocarbylmagnesium halide, hydrocarbylmagnesium carboxylate, hydrocarbylmagnesium alkoxide, and hydrocarbylmagnesium aryloxide.

Specific examples of organomagnesium compounds represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

Various halogen-containing compounds, or mixtures thereof, that contain one or more labile halogen atoms can be employed. Examples of halogen atoms include, but are not limited to, fluorine, chlorine, bromine, and iodine. A combination of two or more halogen-containing compounds having different halogen atoms can also be utilized. In one or more embodiments, the halogen-containing compounds may be soluble in a hydrocarbon solvent. In other embodiments, hydrocarbon-insoluble halogen-containing compounds, which can be suspended in the polymerization medium to form the catalytically active species, may be useful.

Suitable types of halogen-containing compounds include elemental halogens, mixed halogens, hydrogen halides, organic halides, inorganic halides, metallic halides, and organometallic halides.

Elemental halogens include fluorine, chlorine, bromine, and iodine. Mixed halogens include iodine monochloride, iodine monobromide, iodine trichloride, and iodine pentafluoride.

Hydrogen halides include hydrogen fluoride, hydrogen chloride, hydrogen bromide, and hydrogen iodide.

Organic halides include t-butyl chloride, t-butyl bromides, t-butyl iodide, allyl chloride, allyl bromide, allyl iodide, carbon tetrachloride, carbon tetrabromide, carbon tetraiodide, chloroform, bromoform, iodoform, benzyl chloride, benzyl bromide, benzyl iodide, diphenylmethyl chloride, diphenylmethyl bromide, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylsilyl chloride, trimethylsilyl bromide, trimethylsilyl iodide, benzoyl chloride, benzoyl bromide, propionyl chloride, propionyl bromide, methyl chloroformate, and methyl bromoformate.

Inorganic halides include phosphorus trichloride, phosphorus tribromide, phosphorus triiodide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include tin tetrachloride, tin tetrabromide, tin tetraiodide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include dimethylaluminum chloride, diethylaluminum chloride, diisobutylaluminum chloride, dimethylaluminum bromide, diethylaluminum bromide, diisobutylaluminum bromide, dimethylaluminum fluoride, diethylaluminum fluoride, diisobutylaluminum fluoride, dimethylaluminum iodide, diethylaluminum iodide, diisobutylaluminum iodide, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Compounds containing non-coordinating anions are known in the art. In general, non-coordinating anions are sterically bulky anions that do not form coordinate bonds with, for example, the active center of a catalyst system due to steric hindrance. Exemplary non-coordinating anions include tetraarylborate anions and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

The lanthanide-based catalyst composition used in this invention may be formed by combining or mixing the foregoing catalyst ingredients. Although one or more active catalyst species are believed to result from the combination of the lanthanide-based catalyst ingredients, the degree of interaction or reaction between the various catalyst ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The foregoing lanthanide-based catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide compound is best described in terms of the ratio of the moles of halogen atoms in the halogen-containing compound to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

The lanthanide-based catalyst composition can be formed by various methods.

In one embodiment, the lanthanide-based catalyst composition may be formed in situ by adding the catalyst ingredients to a solution containing monomer and solvent, or to bulk monomer, in either a stepwise or simultaneous manner. In one embodiment, the alkylating agent can be added first, followed by the lanthanide compound, and then followed by the halogen-containing compound, if used, or by the compound containing a non-coordinating anion or the non-coordinating anion precursor.

In another embodiment, the lanthanide-based catalyst composition may be preformed. That is, the catalyst ingredients are pre-mixed outside the polymerization system either in the absence of any monomer or in the presence of a small amount of at least one conjugated diene monomer at an appropriate temperature, which may be from about −20° C. to about 80° C. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting catalyst composition may be aged, if desired, prior to being added to the monomer that is to be polymerized.

In yet another embodiment, the lanthanide-based catalyst composition may be formed by using a two-stage procedure. The first stage may involve combining the alkylating agent with the lanthanide compound either in the absence of any monomer or in the presence of a small amount of at least one conjugated diene monomer at an appropriate temperature, which may be from about −20° C. to about 80° C. The amount of monomer employed in the first stage may be similar to that set forth above for performing the catalyst. In the second stage, the mixture formed in the first stage and the halogen-containing compound, non-coordinating anion, or non-coordinating anion precursor can be charged in either a stepwise or simultaneous manner to the monomer that is to be polymerized.

In one or more embodiments, a solvent may be employed as a carrier to either dissolve or suspend the catalyst in order to facilitate the delivery of the catalyst to the polymerization system. In other embodiments, monomer can be used as the carrier. In yet other embodiments, the catalyst can be used in their neat state without any solvent.

In one or more embodiments, suitable solvents include those organic compounds that will not undergo polymerization or incorporation into propagating polymer chains during the polymerization of monomer in the presence of the catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The production of the reactive polymer according to this invention can be accomplished by polymerizing conjugated diene monomer in the presence of a catalytically effective amount of the coordination catalyst. The introduction of the catalyst, the conjugated diene monomer, and any solvent, if employed, forms a polymerization mixture in which the reactive polymer is formed. The amount of the catalyst to be employed may depend on the interplay of various factors such as the type of catalyst employed, the purity of the ingredients, the polymerization temperature, the polymerization rate and conversion desired, the molecular weight desired, and many other factors. Accordingly, a specific catalyst amount cannot be definitively set forth except to say that catalytically effective amounts of the catalyst may be used.

In one or more embodiments, the amount of the coordinating metal compound (e.g., a lanthanide compound) used can be varied from about 0.001 to about 2 mmol, in other embodiments from about 0.005 to about 1 mmol, and in still other embodiments from about 0.01 to about 0.2 mmol per 100 gram of monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Some or all of the resulting polymer chains may possess reactive ends before the polymerization mixture is quenched. As noted above, the reactive polymer prepared with a coordination catalyst may be referred to as a pseudo-living polymer. In one or more embodiments, a polymerization mixture including reactive polymer may be referred to as an active polymerization mixture. The percentage of polymer chains possessing a reactive end depends on various factors such as the type of catalyst, the type of monomer, the purity of the ingredients, the polymerization temperature, the monomer conversion, and many other factors. In one or more embodiments, at least about 20% of the polymer chains possess a reactive end, in other embodiments at least about 50% of the polymer chains possess a reactive end, and in still other embodiments at least about 80% of the polymer chains possess a reactive end. In any event, the reactive polymer can be reacted with nitroso compounds to form the functionalized polymer of this invention.

In one or more embodiments, nitroso compounds include those compounds that contain at least one nitroso group, which may be defined by the formula —N=O. In one or more embodiments, the nitroso compounds may be defined by the formula β-N=O, where β is a mono-valent organic group.

The nitroso compounds may be classified accordingly to the type of the mono-valent organic group β attached to the nitroso group. In one or more embodiments, the β group may be an aliphatic group, a cycloaliphatic group, an aromatic group, or a heterocyclic group. Accordingly, the corresponding nitroso compound may be referred to as an aliphatic, cycloaliphatic, aromatic, or heterocyclic nitroso compound. In those embodiments where the β group is an cycloaliphatic group, an aromatic group, or a heterocyclic group, the β group may be monocyclic, bicyclic, tricyclic, or multicyclic. In those embodiments where the β group is a heterocyclic group, the β group may be aromatic or non-aromatic, may be saturated or unsaturated, and may contain one heteroatom or multiple heteroatoms that are either the same or distinct. In particular embodiments, the heteroatoms may be selected from the group consisting of nitrogen, oxygen, sulfur, boron, silicon, tin, and phosphorus atoms.

The nitroso compounds may also be classified accordingly to the type of atom attached to the nitroso group. In one or more embodiments, the β group may be bonded to the nitroso group through a carbon atom, a nitrogen atom, an oxygen atom, or a sulfur atom that resides within the β group. Depending on the type of atom (e.g., C, N, O, or S atom) through which the β group is bonded to the nitroso group, the corresponding nitroso compounds may be referred to as C-nitroso, N-nitroso, O-nitroso, and S-nitroso compounds, respectively. In one or more embodiments, the remaining substituents or groups attached to the C or N atom may be mono-valent or divalent. In one or more embodiments, the remaining substituents or groups attached to the O or S atom is mono-valent.

In those embodiments where the β group is bonded to the nitroso group through a carbon atom, the β group may be a hydrocarbyl group or substituted hydrocarbyl group. In one or more embodiments, hydrocarbyl groups or substituted hydrocarbyl groups may include, but are not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In those embodiments where the β group is bonded to the nitroso group through a nitrogen atom, the β group may be a protected amino group. In one or more embodiments, protected amino groups include those amino groups that are formed or derived by replacing the two acidic hydrogen atoms of the parent amino group (i.e. —NH$_2$) with substituents such as hydrocarbyl or silyl groups. Exemplary types of protected amino groups include, but are not limited to, bis(trihydrocarbylsilyl)amino, bis(dihydrocarbylhydrosilyl) amino, 1-aza-disila-1-cyclohydrocarbyl, (trihydrocarbylsilyl) (hydrocarbyl)amino, (dihydrocarbylhydrosilyl) (hydrocarbyl)amino, 1-aza-2-sila-1-cyclohydrocarbyl, dihydrocarbylamino, and 1-aza-1-cyclohydrocarbyl groups.

In those embodiments where the β group is bonded to the nitroso group through an oxygen atom, the β group may be a hydrocarbyloxy group or substituted hydrocarbyloxy group. In one or more embodiments, hydrocarbyloxy groups or substituted hydrocarbyloxy groups may include, but are not limited to, alkoxy, cycloalkoxy, alkenoxy, cycloalkenoxy, aryloxy, allyloxy, aralkoxy, alkaryloxy, or alkynoxy groups. Substituted hydrocarbyloxy groups include hydrocarbyloxy groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In those embodiments where the β group is bonded to the nitroso group through a sulfur atom, the β group may be a hydrocarbylthio group or substituted hydrocarbylthio group. In one or more embodiments, hydrocarbylthio groups or substituted hydrocarbylthio groups include, but are not limited to, alkylthio, cycloalkylthio, alkenylthio, cycloalkenylthio, arylthio, allylthio, aralkylthio, alkarylthio, or alkynylthio groups. Substituted hydrocarbylthio groups include hydrocarbylthio groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

Examples of C-nitroso compounds include, but are not limited to, nitrosomethane, nitrosoethane, 1-nitroso-n-propane, 2-nitroso-n-propane, 1-nitroso-n-butane, 2-methyl-2-nitrosopropane, 1-nitroso-n-pentane, 1-nitroso-n-hexane, 1-nitroso-n-heptane, 1-nitroso-n-octane, 1-nitroso-n-nonane, 1-nitroso-n-decane, 1-nitroso-n-dodecane, nitrosocyclopentane, nitrosocyclohexane, nitrosocyclooctane, nitrosobenzene, 2-nitrosotoluene, 3-nitrosotoluene, 4-nitrosotoluene, N,N-dimethyl-4-nitrosoaniline, N,N-diethyl-4-nitrosoaniline, 2-nitrosopyridine, 3-nitrosopyridine, 4-nitrosopyridine, nitrosopyrazine, 2-nitrosopyrimidine, 4-nitrosopyrimidine, 5-nitrosopyrimidine, 3-nitrosopyridazine, 4-nitrosopyridazine, 2-nitrosoquinoline, 3-nitrosoquinoline, 4-nitrosoquinoline, 1-nitrosophthalazine, 2-nitrosoquinazoline, 4-nitrosoquinazoline, 2-nitrosoquinoxaline, 2-nitroso-1,10-phenanthroline, 3-nitroso-1,10-phenanthroline, 4-nitroso-1,10-phenanthroline, 5-nitroso-1,10-phenanthroline, 1-nitrosophenazine, 2-nitrosophenazine, N-methyl-2-nitrosopyrrolidine, N-methyl-2-nitrosopyrrole, N-methyl-3-nitrosopyrrole, N-methyl-2-nitrosoimidazole, N-methyl-4-nitrosoimidazole, N-methyl-5-nitrosoimidazole, N-methyl-3-nitrosopyrazole, N-methyl-4-nitrosopyrazole, N-methyl-5-nitrosopyrazole, N-methyl-2-nitrosopiperidine, N-methyl-2-nitrosohomopiperidine, N-methyl-2-nitrosomorpholine, N-(trimethylsilyl)-2-nitrosopyrrolidine, N-(trimethylsilyl)-2-nitrosopyrrole, N-(trimethylsilyl)-3-nitrosopyrrole, N-(trimethylsilyl)-2-nitrosoimidazole, N-(trimethylsilyl)-4-nitrosoimidazole, N-(trimethylsilyl)-5-nitrosoimidazole, N-(trimethylsilyl)-3-nitrosopyrazole, N-(trimethylsilyl)-4-nitrosopyrazole, N-(trimethylsilyl)-5-nitrosopyrazole, N-(trimethylsilyl)-2-nitrosopiperidine, N-(trimethylsilyl)-2-nitrosohomopiperidine, and N-(trimethylsilyl)-2-nitrosomorpholine.

Examples of N-nitroso compounds include, but are not limited to N-nitrosopyrrolidine, N-nitrosopyrrole, N-nitrosoimidazole, N-nitrosopyrazole, N-nitrosopiperidine, N-nitrosohomopiperidine, N-nitrosomorpholine, N-nitrosonornicotine, N-nitrosodimethylamine, N-nitrosodiethylamine, N-nitrosodi-n-propylamine, N-nitrosodiisopropylamine N-nitrosodi-n-butylamine, N-nitrosodiisobutylamine, N-nitrosodi-t-butylamine, N-nitrosodineopentylamine, N-nitrosodiphenylamine, N-nitrosodibenzylamine, N-nitrosodi-2-tolylamine, N-nitrosodi-3-tolylamine, N-nitrosodi-4-tolylamine, N-nitrosodi-2-pyridylamine, N-benzyl-N-nitroso-p-toluenesulfonamide, N-nitrosobis(trimethylsilyl)amine, N-nitrosobis(triethylsilyl)amine, N-nitrosobis(triisopropylsilyl)amine, N-nitrosobis(triphenylsilyl)amine, and N-nitroso(trimethylsilyl)(methyl)amine.

Examples of O-nitroso compounds, which may also be referred to as nitrite compounds, include, but are not limited to, methyl nitrite, ethyl nitrite, n-propyl nitrite, isopropyl nitrite, n-butyl nitrite, isobutyl nitrite, t-butyl nitrite, neopentyl nitrite, benzyl nitrite, phenyl nitrite, trimethylsilyl nitrite, triethylsilyl nitrite, triisopropylsilyl nitrite, and triphenylsilyl nitrite.

Examples of S-nitroso compounds, which may also be referred to as thionitrite compounds, include, but are not limited to, methyl thionitrite, ethyl thionitrite, n-propyl thionitrite, isopropyl thionitrite, n-butyl thionitrite, isobutyl thionitrite, t-butyl thionitrite, neopentyl thionitrite, benzyl thionitrite, phenyl thionitrite trimethylsilyl thionitrite, triethylsilyl thionitrite, triisopropylsilyl thionitrite, and triphenylsilyl thionitrite.

The amount of the nitroso compound that can be added to the polymerization mixture may depend on various factors including the type and amount of catalyst used to synthesize the reactive polymer and the desired degree of functionalization. In one or more embodiments, where the reactive polymer is prepared by employing a lanthanide-based catalyst, the amount of the nitroso compound employed can be described with reference to the lanthanide metal of the lanthanide compound. For example, the molar ratio of the nitroso compound to the lanthanide metal may be from about 1:1 to about 200:1, in other embodiments from about 5:1 to about 150:1, and in other embodiments from about 10:1 to about 100:1.

In one or more embodiments, in addition to the nitroso compound, a co-functionalizing agent may also be added to the polymerization mixture to yield a functionalized polymer with tailored properties. A mixture of two or more co-functionalizing agents may also be employed. The co-functionalizing agent may be added to the polymerization mixture prior to, together with, or after the introduction of the nitroso compound. In one or more embodiments, the co-functionalizing agent is added to the polymerization mixture at least 5 minutes after, in other embodiments at least 10 minutes after, and in other embodiments at least 30 minutes after the introduction of the nitroso compound.

In one or more embodiments, co-functionalizing agents include compounds or reagents that can react with a reactive polymer produced by this invention and thereby provide the polymer with a functional group that is distinct from a propagating chain that has not been reacted with the co-functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the co-functionalizing agent and the reactive polymer proceeds via an addition or substitution reaction.

Useful co-functionalizing agents may include compounds that simply provide a functional group at the end of a polymer chain without joining two or more polymer chains together, as well as compounds that can couple or join two or more polymer chains together via a functional linkage to form a single macromolecule. The latter type of co-functionalizing agents may also be referred to as coupling agents.

In one or more embodiments, co-functionalizing agents include compounds that will add or impart a heteroatom to the polymer chain. In particular embodiments, co-functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable co-functionalizing agents include those compounds that contain groups that may react with the reactive polymers produced in accordance with this invention. Exemplary co-functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of co-functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875,484, all of which are incorporated herein by reference.

In particular embodiments, the co-functionalizing agents employed may be metal halides, metalloid halides, alkoxysilanes, metal carboxylates, hydrocarbylmetal carboxylates, hydrocarbylmetal ester-carboxylates, and metal alkoxides.

Exemplary metal halide compounds include tin tetrachloride, tin tetrabromide, tin tetraiodide, n-butyltin trichloride, phenyltin trichloride, di-n-butyltin dichloride, diphenyltin dichloride, tri-n-butyltin chloride, triphenyltin chloride, germanium tetrachloride, germanium tetrabromide, germanium tetraiodide, n-butylgermanium trichloride, di-n-butylgermanium dichloride, and tri-n-butylgermanium chloride.

Exemplary metalloid halide compounds include silicon tetrachloride, silicon tetrabromide, silicon tetraiodide, methyltrichlorosilane, phenyltrichlorosilane, dimethyldichlorosilane, diphenyldichlorosilane, boron trichloride, boron tribromide, boron triiodide, phosphorous trichloride, phosphorous tribromide, and phosphorus triiodide.

In one or more embodiments, the alkoxysilanes may include at least one group selected from the group consisting of an epoxy group and an isocyanate group.

Exemplary alkoxysilane compounds including an epoxy group include (3-glycidyloxypropyl)trimethoxysilane, (3-glycidyloxypropyl)triethoxysilane, (3-glycidyloxypropyl)triphenoxysilane, (3-glycidyloxypropyl)methyldimethoxysilane, (3-glycidyloxypropyl)methyldiethoxysilane, (3-glycidyloxypropyl)methyldiphenoxysilane, [2-(3,4-epoxycyclohexyl)ethyl]trimethoxysilane, and [2-(3,4-epoxycyclohexyl)ethyl]triethoxysilane.

Exemplary alkoxysilane compounds including an isocyanate group include (3-isocyanatopropyl)trimethoxysilane, (3-isocyanatopropyl)triethoxysilane, (3-isocyanatopropyl) triphenoxysilane, (3-isocyanatopropyl)methyldimethoxysilane, (3-isocyanatopropyl)methyldiethoxysilane (3-isocyanatopropyl)methyldiphenoxysilane, and (isocyanatomethyl)methyldimethoxysilane.

Exemplary metal carboxylate compounds include tin tetraacetate, tin bis(2-ethylhexanaote), and tin bis(neodecanoate).

Exemplary hydrocarbylmetal carboxylate compounds include triphenyltin 2-ethylhexanoate, tri-n-butyltin 2-ethylhexanoate, tri-n-butyltin neodecanoate, triisobutyltin 2-ethylhexanoate, diphenyltin bis(2-ethylhexanoate), di-n-butyltin bis(2-ethylhexanoate), di-n-butyltin bis(neodecanoate), phenyltin tris(2-ethylhexanoate), and n-butyltin tris(2-ethylhexanoate).

Exemplary hydrocarbylmetal ester-carboxylate compounds include di-n-butyltin bis(n-octylmaleate), di-n-octyltin bis(n-octylmaleate), diphenyltin bis(n-octylmaleate), di-n-butyltin bis(2-ethylhexylmaleate), di-n-octyltin bis(2-ethylhexylmaleate), and diphenyltin bis(2-ethylhexylmaleate).

Exemplary metal alkoxide compounds include dimethoxytin, diethoxytin, tetraethoxytin, tetra-n-propoxytin, tetraisopropoxytin, tetra-n-butoxytin, tetraisobutoxytin, tetra-t-butoxytin, and tetraphenoxytin.

The amount of the co-functionalizing agent that can be added to the polymerization mixture may depend on various factors including the type and amount of catalyst used to synthesize the reactive polymer and the desired degree of functionalization. In one or more embodiments, where the reactive polymer is prepared by employing a lanthanide-based catalyst, the amount of the co-functionalizing agent employed can be described with reference to the lanthanide metal of the lanthanide compound. For example, the molar ratio of the co-functionalizing agent to the lanthanide metal may be from about 1:1 to about 200:1, in other embodiments from about 5:1 to about 150:1, and in other embodiments from about 10:1 to about 100:1.

The amount of the co-functionalizing agent employed can also be described with reference to the nitroso compound. In one or more embodiments, the molar ratio of the co-functionalizing agent to the nitroso compound may be from about 0.05:1 to about 1:1, in other embodiments from about 0.1:1 to about 0.8:1, and in other embodiments from about 0.2:1 to about 0.6:1

In one or more embodiments, the nitroso compound (and optionally the co-functionalizing agent) may be introduced to the polymerization mixture at a location (e.g., within a vessel) where the polymerization has been conducted. In other embodiments, the nitroso compound may be introduced to the polymerization mixture at a location that is distinct from where the polymerization has taken place. For example, the nitroso compound may be introduced to the polymerization mixture in downstream vessels including downstream reactors or tanks, in-line reactors or mixers, extruders, or devolatilizers.

In one or more embodiments, the nitroso compound (and optionally the co-functionalizing agent) can be reacted with the reactive polymer after a desired monomer conversion is achieved but before the polymerization mixture is quenched by a quenching agent. In one or more embodiments, the reaction between the nitroso compound and the reactive polymer may take place within 30 minutes, in other embodiments within 5 minutes, and in other embodiments within one minute after the peak polymerization temperature is reached. In one or more embodiments, the reaction between the nitroso compound and the reactive polymer can occur once the peak polymerization temperature is reached. In other embodiments, the reaction between the nitroso compound and the reactive polymer can occur after the reactive polymer has been stored. In one or more embodiments, the storage of the reactive polymer occurs at room temperature or below under an inert atmosphere. In one or more embodiments, the reaction between the nitroso compound and the reactive polymer may take place at a temperature from about 10° C. to about 150° C., and in other embodiments from about 20° C. to about 100° C. The time required for completing the reaction between the nitroso compound and the reactive polymer depends on various factors such as the type and amount of the catalyst used to prepare the reactive polymer, the type and amount of the nitroso compound, as well as the temperature at which the functionalization reaction is conducted. In one or more embodiments, the reaction between the nitroso compound and the reactive polymer can be conducted for about 10 to 60 minutes.

In one or more embodiments, after the reaction between the reactive polymer and the nitroso compound (and optionally the co-functionalizing agent) has been accomplished or completed, a quenching agent can be added to the polymerization mixture in order to protonate the reaction product between the reactive polymer and the nitroso compound, inactivate any residual reactive polymer chains, and/or inactivate the catalyst or catalyst components. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

In other embodiments, before the polymerization mixture is quenched with a quenching agent, the reaction product between the reactive polymer and the nitroso compound is further reacted with an electrophilic reagent. Useful electrophilic reagents include those that can be defined by the formula R—X, where R is a mono-valent organic group, and X is a halogen atom, a sulfonate group, or a thiosulfonate group. Exemplary halogen atoms include fluorine, chlorine, bromine, and iodine atoms. Exemplary sulfonate groups include methanesulfonate, benzenesulfonate, p-toluenesulfonate, and trifluoromethanesulfonate groups. Exemplary thiosulfonate groups include methanethiosulfonate, benzenethiosulfonate, p-toluenethiosulfonate, and trifluoromethanethiosulfonate groups.

Specific examples of useful electrophilic reagents include methyl chloride, methyl bromide, methyl iodide, trimethylsilyl chloride, trimethylsilyl bromide, trimethylsilyl iodide, methyl methanesulfonate, methyl benzenesulfonate, methyl p-toluenesulfonate, methyl trifluoromethanesulfonate, methyl methanethiosulfonate, trimethylsilyl methanesulfonate, trimethylsilyl benzenesulfonate, trimethylsilyl p-toluenesulfonate, trimethylsilyl trifluoromethanesulfonate, and trimethylsilyl methanethiosulfonate.

When the reaction involving the electrophilic reagent has been completed, a quenching agent and/or an antioxidant may be added to the polymerization mixture, as described above.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

While the reactive polymer and the nitroso compound (and optionally the co-functionalizing agent) are believed to react to produce a novel functionalized polymer, which can be protonated or further modified, the exact chemical structure of the functionalized polymer produced in every embodiment is not known with any great degree of certainty, particularly as the structure relates to the residue imparted to the polymer chain end by the nitroso compound and optionally the co-functionalizing agent. Indeed, it is speculated that the structure of the functionalized polymer may depend upon various factors such as the conditions employed to prepare the reactive polymer (e.g., the type and amount of the catalyst) and the conditions employed to react the nitroso compound (and optionally the co-functionalizing agent) with the reactive polymer (e.g., the types and amounts of the nitroso compound and the co-functionalizing agent).

In one or more embodiments, one of the products resulting from the reaction between the nitroso compound and the reactive polymer may, after reaction with a quenching agent or an electrophilic reagent, include a functionalized polymer defined by one of the formulae:

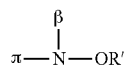

where π is a cis-1,4-polydiene chain having a cis-1,4-linkage content that is greater than 60%, where β is a mono-valent organic group as described above, and where R' is a hydrogen atom or a mono-valent organic group.

In one or more embodiments, the functionalized polymers prepared according to this invention may contain unsaturation. In these or other embodiments, the functionalized polymers are vulcanizable. In one or more embodiments, the functionalized polymers can have a glass transition temperature ($T_g$) that is less than 0° C., in other embodiments less than −20° C., and in other embodiments less than −30° C. In one embodiment, these polymers may exhibit a single glass transition temperature. In particular embodiments, the polymers may be hydrogenated or partially hydrogenated.

In one or more embodiments, the functionalized polymers of this invention may be cis-1,4-polydienes having a cis-1,4-linkage content that is greater than 60%, in other embodiments greater than about 75%, in other embodiments greater than about 90%, and in other embodiments greater than about 95%, where the percentages are based upon the number of diene mer units adopting the cis-1,4 linkage versus the total number of diene mer units. Also, these polymers may have a 1,2-linkage content that is less than about 7%, in other embodiments less than 5%, in other embodiments less than 2%, and in other embodiments less than 1%, where the percentages are based upon the number of diene mer units adopting the 1,2-linkage versus the total number of diene mer units. The balance of the diene mer units may adopt the trans-1,4-linkage. The cis-1,4-, 1,2-, and trans-1,4-linkage contents can be determined by infrared spectroscopy. The number average molecular weight ($M_n$) of these polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The molecular weight distribution or polydispersity ($M_w/M_n$) of these polymers may be from about 1.5 to about 5.0, and in other embodiments from about 2.0 to about 4.0.

Advantageously, the functionalized polymers of this invention exhibit improved cold-flow resistance and provide rubber compositions that demonstrate reduced hysteresis. The functionalized polymers are particularly useful in preparing rubber compositions that can be used to manufacture tire components. Rubber compounding techniques and the additives employed therein are generally disclosed in *The Compounding and Vulcanization of Rubber*, in *Rubber Technology* (2$^{nd}$ Ed. 1973).

The rubber compositions can be prepared by using the functionalized polymers alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomers, the copolymerization of conjugated diene monomers with other monomers such as vinyl-substituted aromatic monomers, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks includes furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the functionalized polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the functionalized polymer of this invention and silica in the substantial absence of coupling agents and shielding agents.

The rubber compositions prepared from the functionalized polymers of this invention are particularly useful for forming tire components such as treads, subtreads, sidewalls, body ply skims, bead filler, and the like. Preferably, the functional polymers of this invention are employed in tread and sidewall formulations. In one or more embodiments, these tread or sidewall formulations may include from about 10% to about 100% by weight, in other embodiments from about 35% to about 90% by weight, and in other embodiments from about 50% to about 80% by weight of the functionalized polymer based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

Synthesis of Unmodified Cis-1,4-Polybutadiene

To a 2-gallon nitrogen-purged reactor equipped with turbine agitator blades were added 1383 g of hexane and 3083 g of 20.6 wt % butadiene in hexane. A preformed catalyst was prepared by mixing 8.08 ml of 4.32 M methylaluminoxane in toluene, 1.83 g of 20.6 wt % 1,3-butadiene in hexane, 0.65 ml of 0.537 M neodymium versatate in cyclohexane, 7.33 ml of 1.0 M diisobutylaluminum hydride in hexane, and 1.40 ml of 1.0 M diethylaluminum chloride in hexane. The catalyst was aged for 15 minutes and charged into the reactor. The reactor jacket temperature was then set to 65° C. Forty five minutes after addition of the catalyst, the polymerization mixture was cooled to room temperature. The resulting polymer cement was coagulated with 12 liters of isopropanol containing 5 g of 2,6-di-tert-butyl-4-methylphenol and then drum-dried. The Mooney viscosity ($ML_{1+4}$) of the resulting polymer was determined to be 26.5 at 100° C. by using a Monsanto Mooney viscometer with a large rotor, a one-minute warm-up time, and a four-minute running time. As determined by gel permeation chromatography (GPC), the polymer had a number average molecular weight ($M_n$) of 111,800, a weight average molecular weight ($M_w$) of 209,500, and a molecular weight distribution ($M_w/M_n$) of 1.87. The infrared spectroscopic analysis of the polymer indicated a cis-1,4-linkage content of 94.4%, a trans-1,4-linkage content of 5.1%, and a 1,2-linkage content of 0.5%.

The cold-flow resistance of the polymer was measured by using a Scott plasticity tester. Approximately 2.6 g of the polymer was molded, at 100° C. for 20 minutes, into a cylindrical button with a diameter of 15 mm and a height of 12 mm. After cooling down to room temperature, the button was removed from the mold and placed in a Scott plasticity tester at room temperature. A 5-kg load was applied to the specimen. After 8 minutes, the residual gauge (i.e., sample thickness) was measured and taken as an indication of the cold-flow resistance of the polymer. Generally, a higher residual gauge value indicates better cold-flow resistance.

The properties of the unmodified cis-1,4-polybutadiene are summarized in Table 1.

TABLE 1

PHYSICAL PROPERTIES OF UNMODIFIED AND MODIFIED CIS-1,4-POLYBUTADIENE

| | Example No. | | | |
|---|---|---|---|---|
| | Example 1 | Example 2 | Example 3 | Example 4 |
| Polymer type | unmodified | unmodified | NSB-modified | NST-modified |
| $ML_{1+4}$ at 100° C. | 26.5 | 44.2 | 44.1 | 37.7 |
| $M_n$ | 111,800 | 130,700 | 116,200 | 111,000 |
| $M_w$ | 209,500 | 260,500 | 220,500 | 204,700 |
| $M_w/M_n$ | 1.87 | 1.99 | 1.89 | 1.84 |
| Cold-flow gauge (mm at 8 min.) | 1.72 | 2.28 | 3.03 | 2.59 |
| % cis-1,4 | 94.4 | 95.0 | 94.3 | 94.3 |
| % trans-1,4 | 5.1 | 4.5 | 5.2 | 5.2 |
| % 1,2 | 0.5 | 0.5 | 0.5 | 0.5 |

Example 2

Synthesis of Unmodified Cis-1,4-Polybutadiene

To a 2-gallon nitrogen-purged reactor equipped with turbine agitator blades were added 1631 g of hexane and 2835 g of 22.4 wt % butadiene in hexane. A preformed catalyst was prepared by mixing 6.10 ml of 4.32 M methylaluminoxane in toluene, 1.27 g of 22.4 wt % 1,3-butadiene in hexane, 0.49 ml of 0.537 M neodymium versatate in cyclohexane, 5.53 ml of 1.0 M diisobutylaluminum hydride in hexane, and 1.05 ml of 1.0 M diethylaluminum chloride in hexane. The catalyst was aged for 15 minutes and charged into the reactor. The reactor jacket temperature was then set to 65° C. Seventy two minutes after addition of the catalyst, the polymerization mixture was cooled to room temperature. The resulting polymer cement was coagulated with 12 liters of isopropanol containing 5 g of 2,6-di-tert-butyl-4-methylphenol and then drum-dried. The properties of the resulting polymer are summarized in Table 1.

Example 3

Synthesis of Cis-1,4-Polybutadiene Modified with Nitrosobenzene (NSB)

To a 2-gallon nitrogen-purged reactor equipped with turbine agitator blades were added 1579 g of hexane and 2886 g of 22.0 wt % butadiene in hexane. A preformed catalyst was prepared by mixing 9.55 ml of 4.32 M methylaluminoxane in toluene, 2.03 g of 22.0 wt % 1,3-butadiene in hexane, 0.77 ml of 0.537 M neodymium versatate in cyclohexane, 8.67 ml of 1.0 M diisobutylaluminum hydride in hexane, and 1.65 ml of 1.0 M diethylaluminum chloride in hexane. The catalyst was aged for 15 minutes and charged into the reactor. The reactor jacket temperature was then set to 65° C. Fifty minutes after addition of the catalyst, the polymerization mixture was cooled to room temperature.

About 428 g of the resulting unmodified polymer cement was transferred from the reactor to a nitrogen-purged bottle, followed by addition of 5.7 ml of 0.41 M nitrosobenzene (NSB) in toluene. The bottle was tumbled for 30 minutes in a water bath maintained at 65° C. The resulting mixture was coagulated with 3 liters of isopropanol containing 0.5 g of 2,6-di-tert-butyl-4-methylphenol and then drum-dried. The properties of the resulting NSB-modified polymer are summarized in Table 1.

Example 4

Synthesis of Cis-1,4-Polybutadiene Modified with 2-Nitrosotoluene (NST)

About 423 g of the pseudo-living polymer cement as synthesized in Example 3 was transferred from the reactor to a nitrogen-purged bottle, followed by addition of 5.4 ml of 0.43 M nitrosotoluene (NST) in toluene. The bottle was tumbled for 30 minutes in a water bath maintained at 65° C. The resulting mixture was coagulated with 3 liters of isopropanol containing 0.5 g of 2,6-di-tert-butyl-4-methylphenol and then drum-dried. The properties of the resulting NST-modified polymer are summarized in Table 1.

In FIG. 1, the cold-flow resistance of the unmodified and modified cis-1,4-polybutadiene samples synthesized in Examples 1-4 is plotted against the polymer Mooney viscosity. The data indicate that, at the same polymer Mooney viscosity, the NSB- and NST-modified cis-1,4-polybutadiene samples show higher residual cold-flow gauge values and accordingly better cold-flow resistance than the unmodified polymer.

Examples 5-8

Compounding Evaluation of NSB- and NST-Modified Cis-1,4-Polybutadiene vs. Unmodified Cis-1,4-Polybutadiene The unmodified and modified cis-1,4-polybutadiene samples produced in Examples 1-4 were evaluated in a carbon black filled rubber compound. The ingredients used to prepare the vulcanizates are presented in Table 2, wherein the numbers are expressed as parts by weight per hundred parts by weight of rubber (phr).

TABLE 2

COMPOSITIONS OF RUBBER VULCANIZATES PREPARED FROM CIS-1,4-POLYBUTADIENE

| Ingredient | Amount (phr) |
|---|---|
| Cis-1,4-Polybutadiene | 80 |
| Polyisoprene | 20 |
| Carbon black | 50 |
| Oil | 10 |
| Wax | 2 |
| Antioxidant | 1 |
| Zinc oxide | 2.5 |
| Stearic acid | 2 |
| Accelerators | 1.3 |
| Sulfur | 1.5 |
| Total | 170.3 |

The Mooney viscosity ($ML_{1+4}$) of the uncured compound was determined at 130° C. by using a Alpha Technologies Mooney viscometer with a large rotor, a one-minute warm-up time, and a four-minute running time. The tensile strength at break ($T_b$) and the elongation at break ($E_b$) were determined according to ASTM D412. The Payne effect data ($\Delta G'$) and hysteresis data (tan δ) of the vulcanizates were obtained from a dynamic strain sweep experiment, which was conducted at 50° C. and 15 Hz with strain sweeping from 0.1% to 20%. $\Delta G'$ is the difference between G' at 0.1% strain and G' at 20% strain. The physical properties of the vulcanizates are summarized in Table 3 and FIG. 2.

TABLE 3

PHYSICAL PROPERTIES OF RUBBER VULCANIZATES PREPARED FROM CIS-1,4-POLYBUTADIENE

| | Example No. | | | |
|---|---|---|---|---|
| | Example 5 | Example 6 | Example 7 | Example 8 |
| Polymer used | Example 1 | Example 2 | Example 3 | Example 4 |
| Polymer type | Unmodified | unmodified | NSB-modified | NST-modified |
| Compound $ML_{1+4}$ at 130° C. | 51.8 | 69.3 | 57.1 | 57.2 |
| $T_b$ at 23° C. (MPa) | 14.9 | 15.4 | 17.2 | 17.6 |
| $E_b$ at 23° C. (%) | 389 | 391 | 397 | 432 |
| $\Delta G'$ (MPa) | 3.78 | 3.63 | 2.45 | 2.35 |
| tan δ at 50° C., 3% strain | 0.135 | 0.128 | 0.116 | 0.119 |

Figure 2:
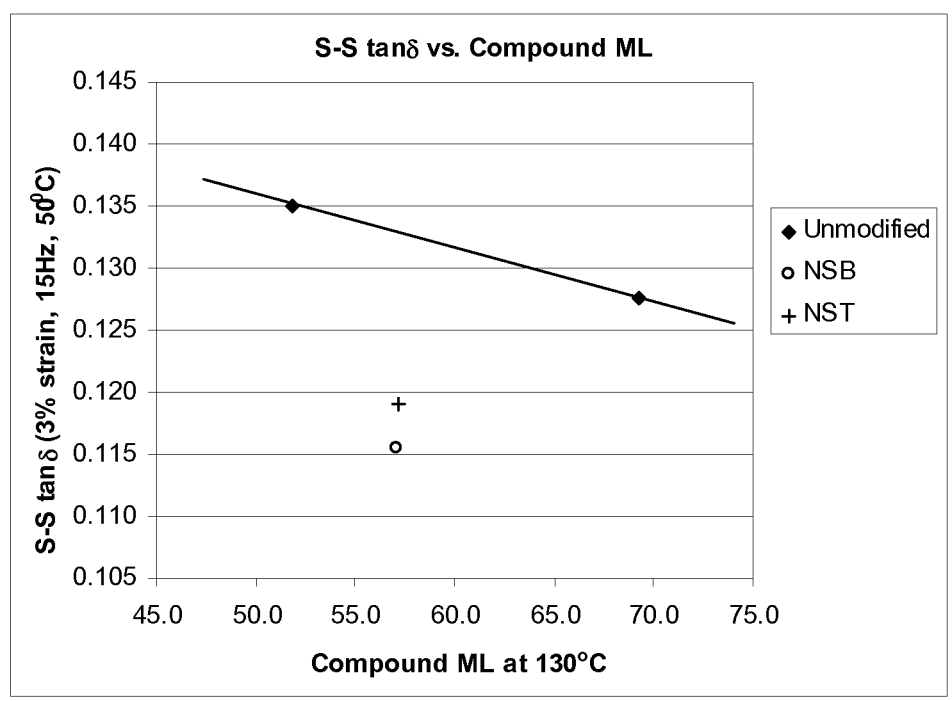
FIG. 2 is a graphical plot of hysteresis loss (tan δ) versus Mooney viscosity (ML 1+4 at 130° C.) for vulcanizates prepared from functionalized cis-1,4-polybutadiene prepared according to one or more embodiments of the present invention as compared to vulcanizates prepared from unfunctionalized cis-1,4-polybutadiene.

As can be seen in Table 3 and FIG. 2, the NSB- and NST-modified cis-1,4-polybutadiene samples give lower tan δ at 50° C. than the unmodified polymer, indicating that the modification of cis-1,4-polybutadiene with NSB and NST reduces hysteresis. The NSB- and NST-modified cis-1,4-polybutadiene samples also give lower $\Delta G'$ than the unmodified polymer, indicating that the Payne Effect has been reduced due to the stronger interaction between the modified polymer and carbon black.

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising the steps of:
   (i) polymerizing conjugated diene monomer with a coordination catalyst to form a reactive polymer; and
   (ii) reacting the reactive polymer with a nitroso compound, where the reaction product from said step of reacting is subsequently reacted with a compound defined by the formula R—X, where R is a monovalent organic group, and X is a halogen atom, a sulfonate group, or a thiosulfonate group.

2. The method of claim 1, where the reaction product from said step of reacting is subsequently quenched.

3. The method of claim 1, where the coordination catalyst is a lanthanide-based catalyst.

4. The method of claim 1, where X is chlorine.

5. The method of claim 1, where X is bromine.

6. The method of claim 1, where X is a sulfonate group.

7. The method of claim 6, where the sulfonate group is selected from the group consisting of methanesulfonate, benzenesulfonate, p-toluenesulfonate, and trifluoromethanesulfonate groups.

8. The method of claim 1, where X is a thiosulfonate group.

9. The method of claim 8, where the thiosulfonate group is selected from the group consisting of methanethiosulfonate, benzenethiosulfonate, p-toluenethiosulfonate, and trifluoromethanethiosulfonate groups.

10. The method of claim 1, where the compound defined by the formula R—X is selected from the group consisting of methyl chloride, methyl bromide, methyl iodide, trimethylsilyl chloride, trimethylsilyl bromide, trimethylsilyl iodide, methyl methanesulfonate, methyl benzenesulfonate, methyl p-toluenesulfonate, methyl trifluoromethanesulfonate, methyl methanethiosulfonate, trimethylsilyl methanesulfonate, trimethylsilyl benzenesulfonate, trimethylsilyl p-toluenesulfonate, trimethylsilyl trifluoromethanesulfonate, and trimethylsilyl methanethiosulfonate.

11. The method of claim 1, further comprising the step of adding a quenching agent.

12. The method of claim 1, further comprising the step of adding an antioxidant.

* * * * *